United States Patent
McLean

(10) Patent No.: US 8,995,794 B2
(45) Date of Patent: *Mar. 31, 2015

(54) SYSTEM FOR NON-DESTRUCTIVE IMAGE PROCESSING

(71) Applicant: Google Inc., Mountain View, CA (US)

(72) Inventor: Paul McLean, Denver, CO (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/206,635

(22) Filed: Mar. 12, 2014

(65) Prior Publication Data
US 2014/0192067 A1 Jul. 10, 2014

Related U.S. Application Data

(63) Continuation of application No. 13/312,991, filed on Dec. 6, 2011, now Pat. No. 8,712,194.

(51) Int. Cl.
*G06K 9/54* (2006.01)
*G06T 1/20* (2006.01)
*G06T 1/00* (2006.01)

(52) U.S. Cl.
CPC .... *G06T 1/20* (2013.01); *G06T 1/00* (2013.01)
USPC .............................. 382/307; 382/303; 382/305

(58) Field of Classification Search
CPC ..................................... G06T 1/20; G06K 9/54
USPC ................... 382/303, 305, 307; 345/506, 660
See application file for complete search history.

(56) References Cited

U.S. PATENT DOCUMENTS

| | | | | |
|---|---|---|---|---|
| 6,181,836 | B1* | 1/2001 | Delean | 382/302 |
| 6,747,757 | B1* | 6/2004 | Enomoto | 358/1.9 |
| 6,803,923 | B1* | 10/2004 | Hamburg | 345/629 |
| 7,065,255 | B2* | 6/2006 | Chen et al. | 382/260 |
| 7,133,070 | B2* | 11/2006 | Wheeler et al. | 348/223.1 |
| 7,584,337 | B2* | 9/2009 | Rowan et al. | 711/162 |
| 7,599,542 | B2* | 10/2009 | Brockway et al. | 382/132 |
| 7,894,111 | B2* | 2/2011 | Woolfe et al. | 358/518 |
| 7,899,275 | B2* | 3/2011 | Ishikawa et al. | 382/305 |
| 7,932,925 | B2* | 4/2011 | Inbar et al. | 348/208.2 |
| 2004/0228613 | A1* | 11/2004 | Lin et al. | 386/52 |
| 2006/0290703 | A1* | 12/2006 | White et al. | 345/522 |

* cited by examiner

*Primary Examiner* — Kanjibhai Patel
(74) *Attorney, Agent, or Firm* — Dority & Manning, P.A.

(57) ABSTRACT

An image processor comprises a plurality of processing modules coupled together in series. Each of at least two of the processing modules includes an image data input to receive at least one of i) an original image or ii) image data output by a previous processing module in the series. Each of the at least two of the processing modules also includes a processing unit configured to i) detect that image data is to be generated and ii) process image data received via the at least one image data input to generate image data. Each of the at least two of the processing modules also includes a memory to store image data generated by the processing unit.

10 Claims, 5 Drawing Sheets

SYSTEM FOR NON-DESTRUCTIVE IMAGE PROCESSING

CROSS-REFERENCE TO RELATED APPLICATION

This application is a continuation of, and claims priority to, U.S. application Ser. No. 13/312,991, filed Dec. 6, 2011, and titled "System for Non-Destructive Image Processing," the entire disclosure of which is hereby expressly incorporated by reference herein.

FIELD OF THE DISCLOSURE

The present disclosure generally relates to image processing systems and more particularly to non-destructive image processing systems.

BACKGROUND

Raster image data, like that from a digital camera, a scanner, or a photo processing program is generally stored as a two dimensional array of pixels. Each pixel contains data "attributes" of the pixel. Attributes may include color information, grayscale information, and/or the like. Image processing generally includes modifying an image or a portion of an image to adjust its brightness, contrast, sharpness, magnification, color, or other attribute. Image processing may also include generating information such as histogram information. Generally, a user modifies an image by applying a filter. A filter may generate a new pixel value based on one or more pixel values. For example, a new pixel value for a particular pixel location may be generated as a combination of the old pixel value corresponding to that location and values of pixels at surrounding locations. A filter may also perform other types of processing such as adding pixels of different images, subtracting pixels of different images, interpolating pixels between existing pixels, decimating pixels to reduce size of an image, change brightness, change contrast, enhance edges in the image, etc.

A plurality of filters may be applied in series. As each filter is applied, data containing the new attributes of that pixel overwrite the previous data corresponding to that pixel, thus repeatedly modifying the original image data.

After a user has applied multiple filters to an image, a user cannot easily restore the original or previous pixel values if the user decides that one or more filters do not produce desired results. Some systems permit a user to "undo" effects of a last-applied filter.

SUMMARY

In an embodiment, an image processor comprises a plurality of processing modules coupled together in series. Each of at least two of the processing modules includes an image data input to receive at least one of i) an original image or ii) image data output by a previous processing module in the series. Each of the at least two of the processing modules also includes a processing unit configured to i) detect that image data is to be generated and ii) process image data received via the at least one image data input to generate image data. The processing unit is implemented in at least one of i) hardware or ii) one or more processors executing machine readable instructions. Each of the at least two of the processing modules also includes a memory to store image data generated by the processing unit. An output image generated by a last processing module in the series and image data output by each of one or more previous processing modules used to generate the output image are stored in respective memories at the same time.

In another embodiment, a method for non-destructive image processing includes processing an original image with a plurality of processing modules of an image processor, the plurality of processing modules coupled together in series, wherein each processing module non-destructively processes image data corresponding to one of i) the original image or ii) image data output by a previous processing module in the series based on determining that new image data is to be generated by the processing module. The plurality of processing modules are implemented in at least one of i) hardware or ii) one or more processors executing machine readable instructions. Additionally, the method includes storing a respective output of each processing module in a respective memory so that an output image generated by a last processing module in the series and image data output by each of one or more previous processing modules used to generate the output image are in the memories at the same time.

In yet another embodiment, a method for non-destructive image processing includes processing an original image with an image processor to generate a first processed image, wherein the image processor comprises a plurality of processing modules coupled together in series. The plurality of processing modules are implemented in at least one of i) hardware or ii) one or more processors executing machine readable instructions. The method also includes, after generating the first processed image, modifying the image processor by at least one of: i) inserting a first processing module between processing modules in the series, ii) removing a second processing module between a beginning processing module and an ending processing module in the series, or iii) modifying a third processing module between the beginning processing module and the ending processing module in the series. Additionally, the method includes, in response to modifying the image processor, generating a second processed image with the image processor and without processing image data with processing modules in the series before i) the first processing module, ii) a location of the second processing module in the series before removal of the second processing module, or iii) the third processing module.

In still another embodiment, a computer-readable memory stores instructions, that when executed by one or more processors, cause the one or more processors to: process an original image with a plurality of processing modules of an image processor coupled together in series, wherein each processing module non-destructively processes image data corresponding to one of i) the original image or ii) image data output by a previous processing module in the series based on determining that new image data is to be generated by the processing module; and store a respective output of each processing module in a respective memory so that an output image generated by a last processing module in the series and image data output by each of one or more previous processing modules used to generate the output image are in the memories at the same time.

DETAILED DESCRIPTION

Figure 1:
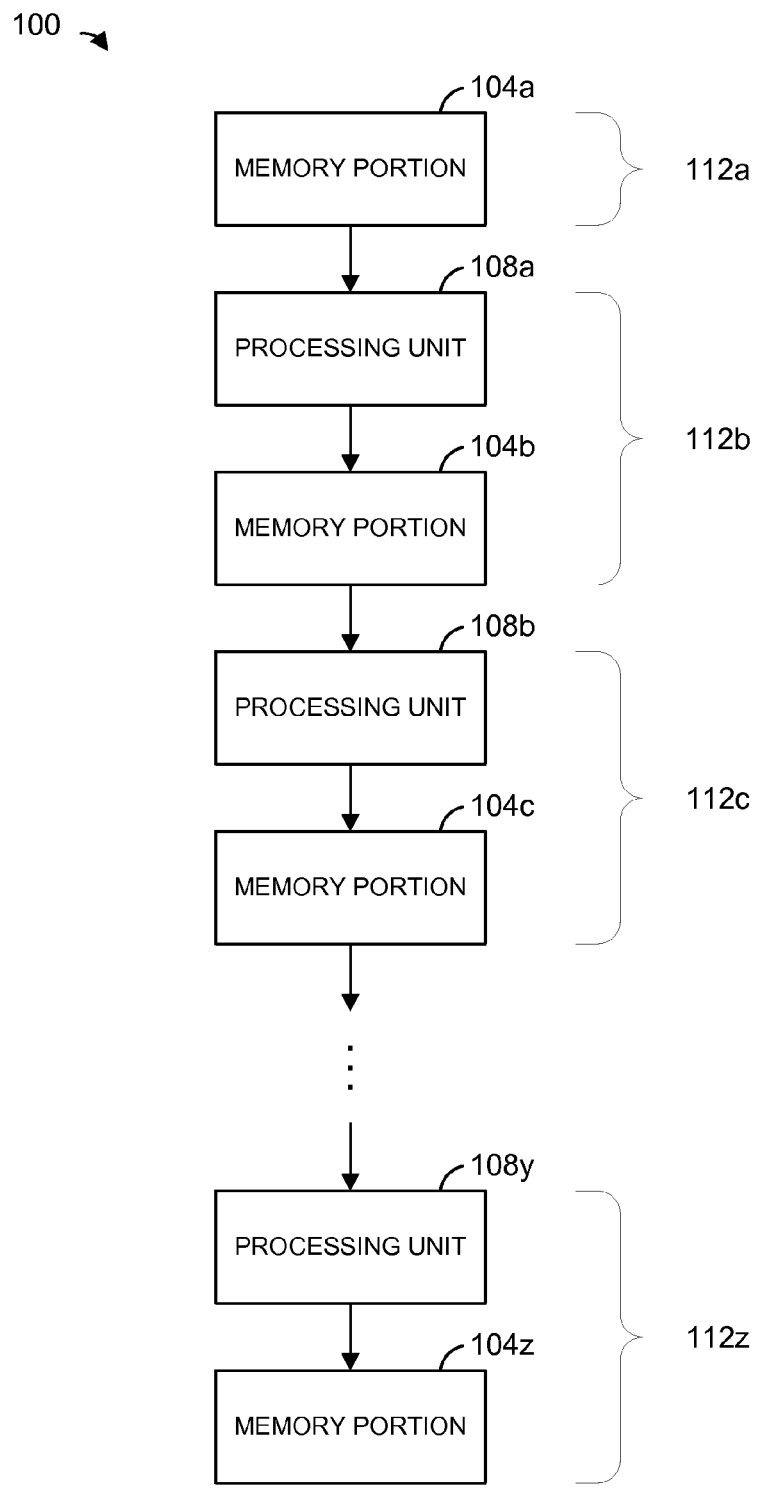
FIG. 1 is a block diagram of an example image processor, according to an embodiment.

FIG. 1 is a block diagram of an example image processor 100, according to an embodiment. The image processor 100 includes a plurality of memory portions 104 and a plurality of processing units 108 coupled alternately in series. Each processing unit 108 may be configured, e.g., by a user, to perform a respective image processing function. The image processor 100 generally may perform a series of desired image processing functions on an original image (e.g., stored in the memory portion 104a) by having each of processing units 108b-108y operate on an output generated by a preceding processing unit 108.

Each pair of a processing unit 108 and a memory unit 104 may correspond to a processing module 112. For example, in an embodiment, each processing unit 108 and the subsequent memory unit 104 is a processing module 112. As another example, in an embodiment, each processing unit 108 and the previous memory unit 104 is a processing module 112. The memory portion 104a may be a component of a processing module 112a. In an embodiment, the processing module 112a omits a processing unit unlike the other processing modules 112. In another embodiment, the processing module 112a includes a processing unit (not shown) that is configured to remain idle, for example.

The image processor 100 may be utilized by an image editing system, such as an image editing system implemented on or using one or more computers such as a server, a personal computer, a smart phone, a set top box, a gaming system, etc. For example, a user interface (e.g., a graphical user interface) may enable a user to configure each image processing unit 108 to perform a desired image processing function, arrange the processing modules in a specified order, etc. In some embodiments, the user interface may enable the user subsequently to reconfigured image processing units 108, re-order the processing modules 112, remove or disable specified ones of the processing modules 112, etc., to observe effects of such modifications in the final output. In some embodiments, a modification to an image processing unit 108 prior to the final processing unit 108y may be enable observing effects on such a modification without having to manually "undo" and "redo" functions performed by other processing units 108.

As an illustrative example, the processing module 112b may be configured to adjust a brightness level of an original image; the processing module 112c may be configured to increase contrast; and the processing module 112z may be configured to perform a deblurring function. In this example, the user may subsequently adjust parameters of the contrast adjustment function of the processing module 112c to see effects of such adjustments on the final image without having to manually "undo" and "redo" the deblurring function of the processing module 112z. As another illustrative example, the user may subsequently remove the processing module 112b (brightness adjustment) to see an effect on the final image without having to manually "undo" and "redo" the contrast adjustment of the processing module 112c and the deblurring function of the processing module 112z.

In some embodiments, the image processor 100 may be implemented on a computer having one or more processors and one or more memory devices. For example, two or more memory portions 104 may correspond to different portions of a single memory device of a computer. The image processing units 108 may correspond to different software modules executed by one or more processors of a computer. A user interface software module executed by one or more processors of the computer may enable a user to configure the image processor 100 by, for example, configuring each processing unit 108, arranging an order of the processing modules 112, etc.

The memory portions 104 may be portions of one or more memory devices. As one example, all of the memory portions 104 may correspond to a single memory device. As another example, each memory portion 104 may correspond to a different memory device. As another example, multiple memory portions 104 may correspond to a first memory device and one or more other memory portions 104 may correspond to a second memory device. Each processing unit 108 may correspond to a software module executed by one or more processors. As one example, all of the processing unit 108 may correspond to software modules executed by a single processor. As another example, each processing unit 108 may correspond to a software module executed by a separate processor. As another example, multiple processing units 108 may correspond to software modules executed by a first processor, and one or more other processing units 108 may correspond to one or more software modules executed by a second processor.

In the example of FIG. 1, an input of a processing unit 108a is coupled to a memory portion 104a, and an output of the processing unit 108a is coupled to a memory portion 104b. An input of a processing unit 108b is coupled to the memory portion 104b, and an output of the processing unit 108b is coupled to a memory portion 104c. The other memory portions 104 and processing units 108 are similarly coupled together.

An original image may be stored to the memory portion 104a. The processing unit 108a may non-destructively process data corresponding to the original image and generate an output. For example, the processing unit 108a may read from, but not alter, the memory portion 104a. The output of the processing unit 104a may be stored in the memory portion 104b. Similarly, the processing unit 108b may non-destructively process data in the memory portion 104b and generate an output. The output of the processing unit 104b may be stored in the memory portion 104c. Similarly, each subsequent processing unit 108 non-destructively processes data from a previous memory portion 104 to generate an output, which is stored in a subsequent memory portion 104. Accordingly, the final memory portion 104z in the sequence contains data corresponding to a resulting output image. Each processing unit 108 is configured to perform an image processing function, such as modifying an image or a portion of an image to generate new image data or non-image data derived from image data. Image processing functions may relate to, for example, adjusting brightness, adjusting contrast, adjusting sharpness, adjusting magnification, adjusting color, filtering, deblurring, generating histogram information, etc.

In some embodiments, a processing unit 108 generates an output in response to determining that new data was written in the previous memory portion 104. Also, a processing unit 108 may determine if it has already generated an output, and may generate an output when it is determined that an output has not yet been generated. For example, if it is determined that an output has already been generated and data in the previous memory portion 104 used to generate the output has not changed, the processing unit 108 may remain idle. On the other hand, if it is determined that an output has not been generated or if it is determined that data in the previous memory portion 104 has changed, the processing unit 108 may generate an output using the data in the previous memory portion 104 and store the output in the subsequent memory portion 104.

In some embodiments, each of at least some of the processing units 108 may generate an indication when the processing unit 108 generates a new output and/or the new output is stored to the subsequent memory portion 104. Additionally or alternatively, each of at least some of the memory portions 104 may be configured to generate an indication when new data is written to the memory portion 104. A processing unit 108 may utilize such an indication from the previous processing unit 108 or the previous memory portion 104 to determine when new data was written in the previous memory portion 104.

Although the example of FIG. 1 illustrates each processing unit 108 receiving data from a single previous memory portion 104, a processing unit 108 may be coupled to multiple memory portions 104, in some embodiments. For example, a processing unit 108 may process multiple images to generate an output. For example, a processing unit 108 may generate a composite of two images, a subtraction of two images, an addition of two images, etc.

Figure 2:
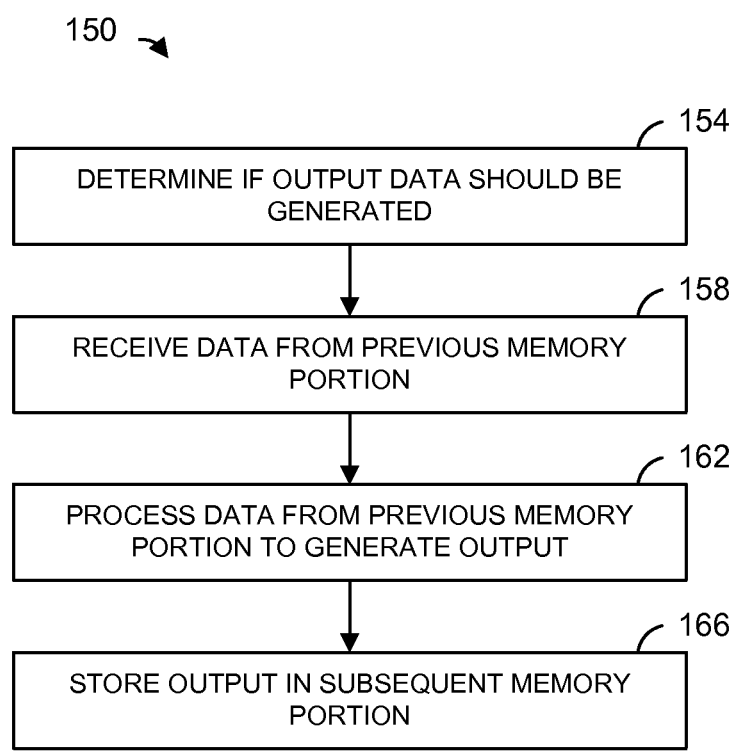
FIG. 2 is a block diagram of an example method of processing image data that may be implemented by a processing module of the image processor of FIG. 1, according to an embodiment.

FIG. 2 is a flow diagram of an example method 150 that may be performed by a processing module of an image processor that includes a plurality of processing modules coupled together in series. For example, the method 150 may be implemented by at least some of the processing modules 112 of FIG. 1, and FIG. 2 will be described with reference to FIG. 1 for ease of explanation. In other embodiments, however, the method 150 is implemented by another suitable processing module of another suitable image processor.

At block 154, it is determined if an output should be generated. For example, a processing unit 108 of a processing module 112 may determine that new data was written in a previous memory portion 104. Additionally or alternatively, the processing unit 108 may determine whether the processing unit 108 has already generated an output corresponding to the current data in the previous memory portion 104.

At block 158, data from a previous memory portion is received. For example, data from a memory portion of a previous processing module 112 is received. As another example, data from a memory portion storing original image data is received. In some embodiments, block 158 is performed only when it is determined at block 154 that an output should be generated. In other embodiments, block 158 is performed whether or not it is determined at block 154 that an output should be generated. In some embodiments, data from a plurality of previous memory portions is received. For example, data from a plurality of previous memory portions is received for the purpose of generating a composite of multiple images, a subtraction of two images, an addition of multiple images, etc.

At block 162, the data received at block 158 is processed to generate an output. In some embodiments, block 162 is performed only when it is determined at block 154 that an output should be generated.

At block 166, the output generated at block 162 is stored in a subsequent memory portion. The subsequent memory portion may be a component of the same processing module 112. For example, the output generated by the processing unit 108*b* is stored in the memory portion 104*c*, and both the processing unit 108*b* and the memory portion 104*c* are components of the processing module 112*c*. In some embodiments, block 166 is performed only when it is determined at block 154 that an output should be generated.

Figure 3:
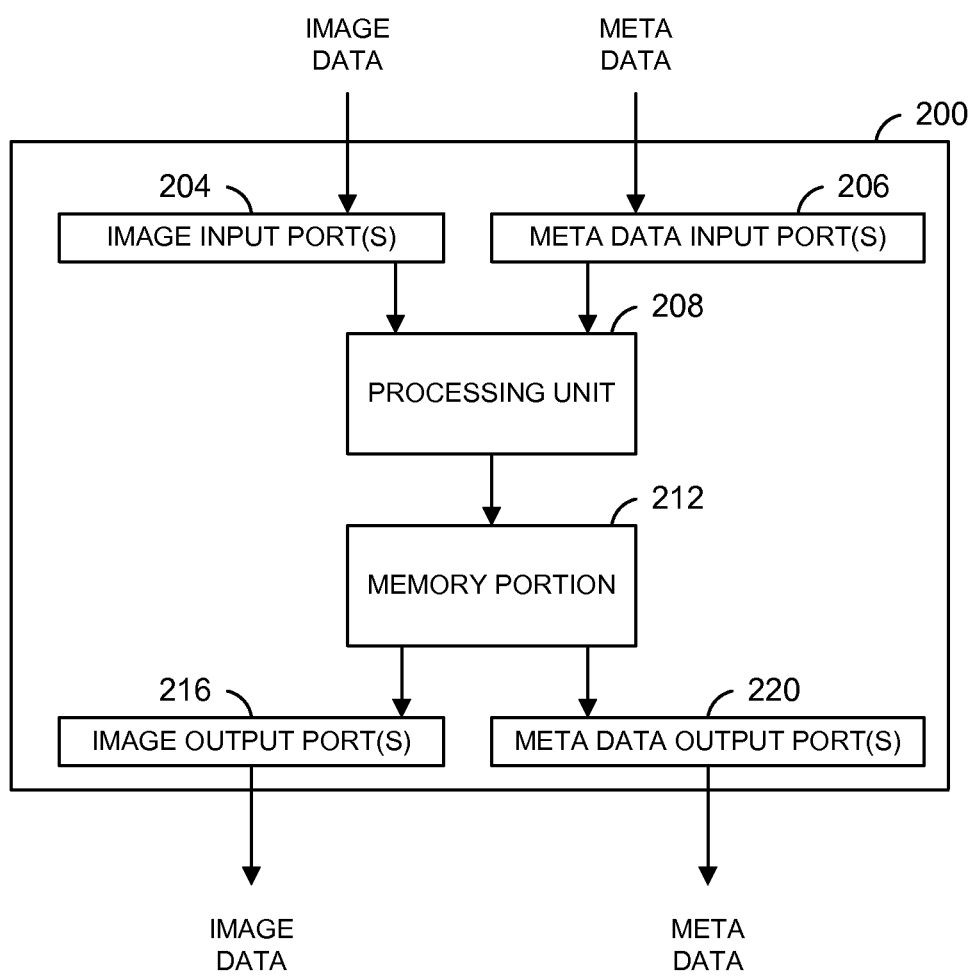
FIG. 3 is a block diagram of an example processing module that may be utilized in an image processor such as the image processor of FIG. 1, according to an embodiment.

FIG. 3 is a block diagram of an example processing module 200 that can be utilized with an image processor such as the image processor 100 of FIG. 1. For example, the processing module 112 of FIG. 1 may include the processing module 200 of FIG. 3. FIG. 3 will be described with reference to FIG. 1 for ease of explanation. In other embodiments, however, the processing module 200 is utilized with another suitable image processor that includes a plurality of processing modules coupled in series.

The processing module 200 may include one or more image input ports 204 to receive image data. The one or more image input ports 204 may be configured to couple to one or more image output ports of another processing module (not shown). For processing multiple images (e.g., image compositing, image addition, image subtraction, etc.), the processing module 200 may include multiple image input ports 204. If the processing module 200 is for storing an original image, the processing module 200 may omit image input ports 204.

The processing module 200 may include one or more meta data input ports 206 to receive non-image data associated with image processing, such as data associated with the processing operation to be performed by the processing module 200 (e.g., configuration parameters, scalar data generated by processing image data, histogram data generated by processing image data, etc.). One or more meta data input ports 206 may be configured to couple to one or more meta data output ports of another processing module (not shown). The processing module 200 may include multiple meta data input ports 206. For example, when processing multiple images (e.g., image compositing, image addition, image subtraction, etc.), the processing module 200 may include multiple meta data input ports 206 corresponding to multiple other processing modules (not shown) that provide the multiple images. If the processing module 200 is for storing an original image, the processing module 200 may omit meta data input ports 206.

The one or more image input ports 204 may be configured to determine when new image data is available for the processing module 200. Similarly, the one or more meta data input ports 206 may be configured to determine when new meta data is available for the processing module 200. The one or more image input ports 204 and/or the one or more meta data input ports 206 may be configured to communicate with one or more image output ports and/or one or more meta data output ports of a previous processing module (not shown) to determine when new image data and/or new meta data are available for the processing module 200. In an embodiment, the one or more image input ports 204 and/or the one or more meta data input ports 206 may be configured to receive one or more signals from the one or more image output ports and/or the one or more meta data output ports of the previous processing module (not shown) that indicate when new image data and/or new meta data are available for the processing module 200.

The processing module 200 may include a processing unit 208 to perform image processing operations on image data received via the one or more image input ports 204. The processing unit 208 may be configured according to an image processing algorithm and/or attributes, parameters, etc., associated with the image processing algorithm. Additionally or alternatively, the processing unit 208 may receive attributes, parameters, etc., associated with the image processing algorithm via the one or more meta data input ports 206. The processing unit 208 may be configured to generate specification data associated with the generated image data, such as image width, image height, pixel format, etc. The processing unit 208 may be configured to generate meta data associated with the image data, such as scalar data associated with the generated image data, histogram data, etc.

In some embodiments, the processing unit 208 may be configured to determine when image and/or meta data is to be generated. For example, the processing unit 208 may be configured to communicate with the image input port(s) 204 and/or the meta data input port(s) 206 to determine when new image data and/or new meta data is available. As another example, the processing unit 208 may be configured to maintain state information that indicates when the processing unit 208 already has generated output image and/or meta data.

The processing unit 208 may be configured to perform a desired image processing function. For example, a user may configure the processing unit 208 to perform an image processing function desired by the user. The user may provide data to the processing unit 208 that indicates a general function to be performed, parameters to be utilized in performing the function, etc.

The processing module 200 may include a memory portion 212 to store image data, specification data, and/or meta data generated by processing unit 208. In an embodiment, the memory portion 212 may be included in a memory device that is shared by multiple processing modules (not shown). In other words, memory portions 212 of multiple processing modules 200 may be included in a single memory device. In another embodiment, the memory portion 212 may be included in a memory device devoted solely to the processing module 200.

The processing module 200 may include one or more image output ports 216 to output image data from the memory portion 212. The one or more image output ports 216 may be configured to couple to one or more image input ports of another processing module (not shown). The one or more image output ports 216 may be configured to retrieve from the memory portion 212 specification data associated with the image data, such as image width, image height, pixel format, etc. Additionally, the one or more image output ports 216 may be configured to retrieve the image data from the memory portion 212. The one or more image output ports 216 may be configured to retrieve the image data from the memory portion 212 using the retrieved specification data associated with the image data. For example, the one or more image output ports 216 may be configured to first retrieve the specification data associated with the image data (e.g., image width, image height, pixel format, etc.) and the use the specification data to retrieve the image data from the memory portion 212.

The processing module 200 may include one or more meta data output ports 220 to output meta data associated with the image data output by the one or more image output ports 216. The one or more meta data output ports 220 may be configured to couple to one or more meta data input ports of another processing module (not shown). The one or more meta data output ports 220 may be configured to retrieve from the memory portion 212 meta data associated with the image data, such as scalar data or histogram data associated with the image data output by the one or more image output ports 216. In some embodiments, one or more meta data output ports 220 may be omitted.

The one or more image output ports 216 may be configured to generate a signal to indicate when the processing unit 208 has generated new image data and/or when new image data is stored in the memory portion 212. Similarly, the one or more meta data output ports 220 may be configured to generate a signal to indicate when the processing unit 208 has generated new meta data and/or when new meta data is stored in the memory portion 212. The one or more image output ports 216 and/or the one or more meta data output ports 220 may be configured to communicate with one or more image input ports and/or one or more meta data input ports of a subsequent processing module (not shown) so that image data and/or meta data is transferred to the subsequent processing module.

Figure 4:
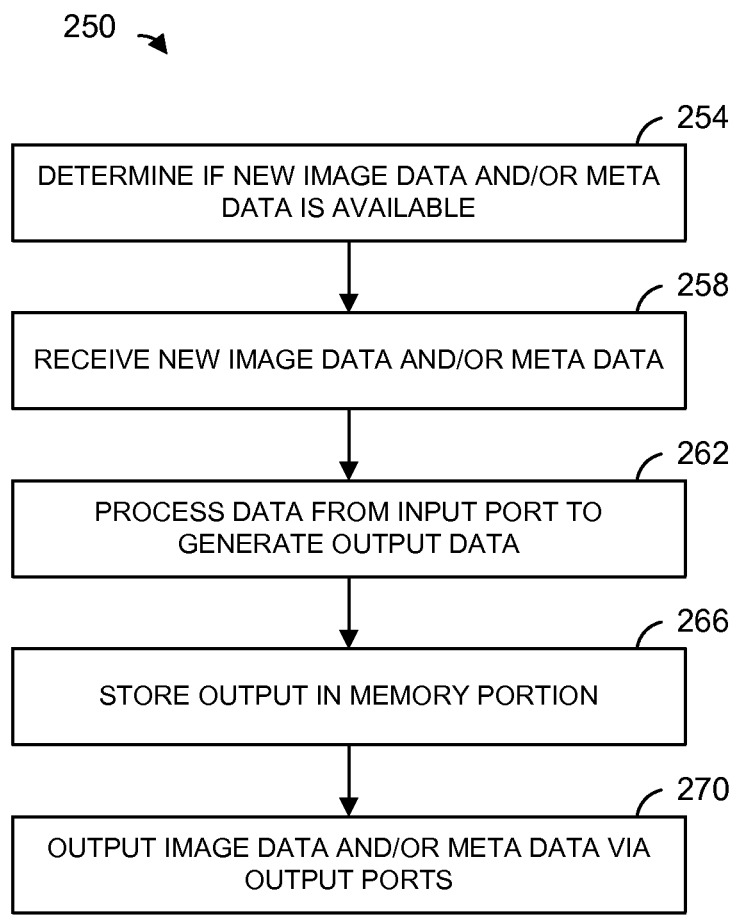
FIG. 4 is a block diagram of an example method of processing image data that may be implemented by the processing module of FIG. 3, according to an embodiment.

FIG. 4 is a flow diagram of an example method 250 that may be performed by a processing module of an image processor that includes a plurality of processing modules coupled together in series. For example, the method 250 may be implemented by the example processing module 200 of FIG. 3, and FIG. 4 will be described with reference to FIG. 3 for ease of explanation. In other embodiments, however, the method 250 is implemented by another suitable processing module.

At block 254, the one or more image input ports 204 determine when new image data is available for the processing module 200 and/or the one or more meta data input ports 206 determine when new meta data is available for the processing module 200. At block 258, the one or more image input ports 204 receive new image data, when available, and/or the one or more meta data input ports 206 receive new meta data, when available. In some embodiments, block 258 is performed only when it is determined at block 254 that new image data and/or new meta data is available.

At block 262, the processing unit 208 processes image data from the one or more input ports 204 to generate output image data and/or output meta data. At block 266, the output generated at block 262 is stored in the memory portion 212. At block 270, image data and/or meta data from the memory portion 212 are output via the one or more image output ports 216 and/or the one or more meta data output ports 220.

In some embodiments, block 262, block 266 and block 270 are performed only when it is determined at block 254 that new image data and/or new meta data is available.

The example apparatus and methods described may enable non-destructive image processing to be performed in an easily reconfigurable manner. For example, using processing modules such as the processing module 250 of FIG. 4, an image processor (similar to the example image processor 100 of FIG. 1) can be configured to perform a plurality of image processing functions in a desired sequence by arranging the processing modules in the desired sequence by appropriately coupling together input ports and output ports of different processing modules. A user interface (e.g., a graphical user interface) may be configured to enable a user to couple together input ports and output ports of different processing modules, configure each processing modules to perform a desired function, etc. For example, the user interface may prompt the user with a list of image processing functions from which a user can select a function to be performed by a particular image processing module 112, 200. Additionally, the user interface may provide user interface mechanisms to permit selection, modification, etc., of parameters corresponding to the image processing function. In other embodiments, a user interface may permit a user to custom design an image processing function to be performed by a particular image processing module 112, 200.

Similarly, the image processor can be easily reconfigured by removing a processing module, for example. If the removed processing module is an intermediate processing module, output ports of the processing module prior to the removed processing module are coupled to input ports of the processing module subsequent to the removed processing module. Also, the image processor can be easily reconfigured by adding a processing module, for example. If the new processing module to be added will be an intermediate processing module, a coupling between output and input ports of adjacent processing modules are severed, and the new processing module is inserted in the series of processing modules by coupling the input ports of the new processing module to output ports of an appropriate processing module, by coupling the output ports of the new processing module to input ports of another appropriate processing module. A user interface (e.g., a graphical user interface) may be configured to enable a user to remove an image processing module 112 from the image processor 100, add a new image processing module 112 to the image processor 100, couple together input ports and output ports of different processing modules 112, etc.

Also, a processing unit of an existing processing module can be modified and/or reconfigured to modify or change the image processing function performed by the processing module. A user interface may provide user interface mechanisms to permit selection, modification, etc., of image processing functions or parameters corresponding to the image processing functions. When the image processor is reconfigured such as described above, processing modules located subsequent to a point of change may be triggered to generate new outputs. On the other hand, processing modules subsequent located prior to the point of change may remain idle.

Figure 5:
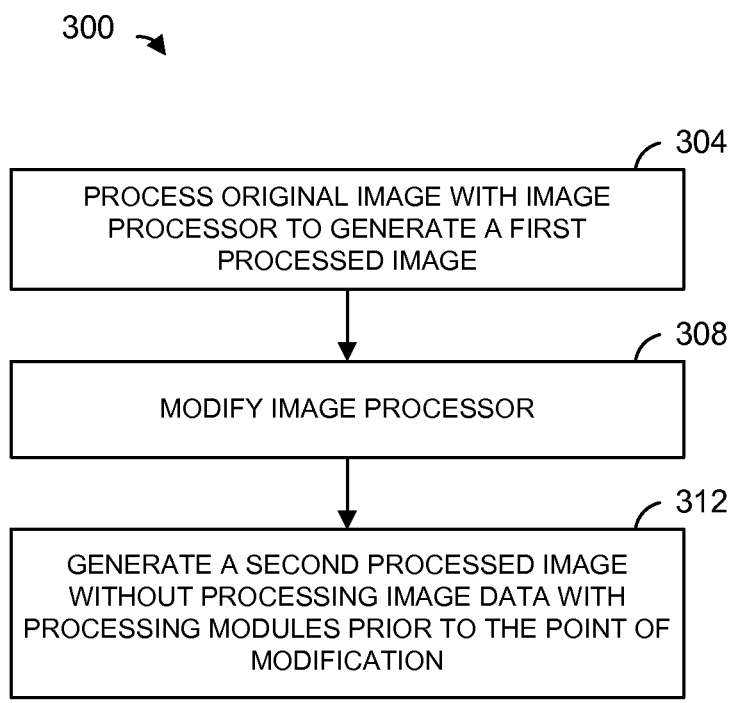
FIG. 5 is a block diagram of an example method of processing an image that may be implemented by the image processor of FIG. 1, according to an embodiment.

FIG. 5 is a flow diagram of an example method 300 that may be performed by an image processor that includes a plurality of processing modules coupled together in series. For example, the method 300 may be implemented by the example image processor of FIG. 1. In other embodiments, however, the method 300 is implemented by another suitable image processor.

At block 304, an original image is processed by the image processor to generate a first processed image. At block 308, the image processor is modified. For example, a new processing module may be inserted between existing processing modules in the series. As another example, a processing module between a beginning processing module and an ending processing module in the series may be removed. As another example, a processing module between the beginning processing module and the ending processing module in the series may be modified so that the modified processing module processes image data differently.

At block 312, a second processed image is generated in response to the modification at block 308. The second processed image may be generated without processing image data with processing modules in the series prior to a point of modification. For example, if a new processing module is added between a second processing module and a third processing module in the series, the second processed image may be generated without processing image data with a first processing module and the second processing module. As another example, if a third processing module in the series is removed, the second processed image may be generated without processing image data with a first processing module and the second processing module. As another example, if the third processing module in the series is modified so that the third processing module processes image data differently, the second processed image may be generated without processing image data with a first processing module and the second processing module.

Although example signal processing methods and signal processors were discussed above in the context of image processing and image processors, similar techniques can be utilized with other types of data. For example, an audio processor may utilize a plurality of processing modules coupled in series to non-destructively process audio data. This may be useful, for example, for evaluating different types of audio processing on a segment of music data, a speech recording, etc.

Image processors and image processing modules such as described may be implemented in hardware, a processor executing firmware and/or software instructions, or any combination thereof. For instance, memory portions of processing modules may be implemented in one or more memory devices such as one or more of a magnetic disk, an optical disk, a random access memory (RAM), a video RAM, a Flash memory, etc. Similarly, processing units of processing modules may be implemented using one or more of discrete components, an integrated circuit, an application-specific integrated circuit (ASIC), a programmable logic device (PLD), etc. If the image processor and/or processing units are implemented using a processor executing firmware and/or software instructions, the software or firmware instructions may be stored in any computer readable memory such as on a magnetic disk, an optical disk, in a RAM or ROM or Flash memory, a memory of a processor (e.g., a cache memory), etc. The processor executing firmware and/or software instructions may comprise a general purpose processor or a special purpose processor such as a digital signal processor (DSP), a graphics processor, etc.

Although the examples described above were in the context of image data and image processing, similar apparatus and methods may be utilized in processing other types of data such as audio data (e.g., speech, music, etc.).

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for non-destructive image processing comprising:
    processing an original image with an image processor, the image processor comprising a plurality of processing modules coupled together in series, the plurality of processing modules in at least one of i) hardware or ii) one or more processors executing machine readable instructions, the original image processed using a first sequence of processing modules to generate a first processed image;
    after generating the first processed image using the first sequence of processing modules, modifying the first sequence of processing modules to produce a second sequence of processing modules of the image processor by at least one of: i) inserting a first processing module between processing modules in the first sequence, ii) removing a second processing module between a beginning processing module and an ending processing module in the first sequence, or iii) modifying a third processing module between the beginning processing module and the ending processing module in the first sequence; and
    in response to modifying the image processor, generating a second processed image with the image processor using the second sequence of processing modules and without processing image data with processing modules in the second sequence before i) the first processing module, ii) a location of the second processing module in the second sequence before removal of the second processing module, or iii) the third processing module.

2. A method according to claim 1, wherein generating the second processed image comprises, at each of a plurality of processing modules after i) the first processing module, ii) the location the second processing module before removal, and/or iii) the third processing module:
  determining that new image data is to be generated;
  receiving respective image data at a respective input of the processing module; and
  processing the respective image data received at the respective input of the processing module to generate respective output data when it is determined that new image data is to be generated.

3. A method according to claim 2, wherein determining that new image data is to be generated comprises detecting that new image data is available from a previous processing module in the series.

4. A method according to claim 3, wherein detecting that new image data is available from the previous processing module in the series comprises receiving a signal from the previous processing module in the series, wherein the signal indicates that new image data is available from the previous processing module.

5. A method according to claim 2, wherein generating the second processed image comprises, at each of the plurality of processing modules after i) the first processing module, ii) the location the second processing module before removal, and/or iii) the third processing module, storing the respective output data in a respective memory of the processing module.

6. A method for non-destructive image processing comprising:
  processing an original image with an image processor comprising a plurality of processing modules that are coupled together in a series, the plurality of processing modules implemented in at least one of i) hardware or ii) one or more processors executing machine readable instructions, the original image processed with the plurality of processors that are coupled together in the series, wherein each processing module non-destructively processes image data corresponding to one of i) the original image or ii) image data output by a previous processing module in the series based on determining that new image data is to be generated by the processing module; and
  storing a respective output of each of the plurality of processing modules of the series in a respective memory so that an output image generated by a last processing module in the series and image data output by each of one or more previous processing modules used to generate the output image are in the memories at the same time.

7. A method according to claim 6, wherein determining that new image data is to be generated by the processing module comprises detecting that i) new original image data is available or ii) new image data is available from a previous processing module in the series.

8. A method according to claim 7, wherein detecting that new image data is available from the previous processing module in the series comprises receiving a signal from the previous processing module in the series, wherein the signal indicates that new image data is available from the previous processing module.

9. A method according to claim 6, wherein processing the original image with the plurality of processing modules includes at least one processing module non-destructively processes image data based on meta data including non-image data associated with image processing.

10. A method according to claim 9, wherein at least one processing module non-destructively processes image data based on meta data received from a previous processing module in the series.

* * * * *